(12) United States Patent
Woods et al.

(10) Patent No.: US 7,716,967 B2
(45) Date of Patent: May 18, 2010

(54) LEAK DETECTOR SLEEVE

(75) Inventors: John Martin Woods, Webb City, MO (US); Robert Stephen Elbert, Joplin, MO (US); Daniel J. Wimer, Jojplin, MO (US)

(73) Assignee: WEW LLC, Joplin, MO (US)

( * ) Notice: Subject to any disclaimer, the term of this patent is extended or adjusted under 35 U.S.C. 154(b) by 504 days.

(21) Appl. No.: 11/457,741

(22) Filed: Jul. 14, 2006

(65) Prior Publication Data

US 2007/0113890 A1     May 24, 2007

Related U.S. Application Data

(60) Provisional application No. 60/737,999, filed on Nov. 18, 2005.

(51) Int. Cl.
G01M 3/08     (2006.01)
F17D 5/02     (2006.01)
F16J 3/00     (2006.01)
(52) U.S. Cl. .................. 73/46; 137/15.11; 277/320
(58) Field of Classification Search ............. 73/46; 137/15.11; 277/320; 138/90
See application file for complete search history.

(56) References Cited

U.S. PATENT DOCUMENTS

| | | | |
|---|---|---|---|
| 294,937 A | 3/1884 | Towle, Jr. | |
| 2,271,549 A | 2/1942 | Henderson | |
| 2,924,546 A | 2/1960 | Shaw | |
| 2,977,995 A | 4/1961 | Walpole | |
| 3,246,916 A | 4/1966 | Hansen, Jr. | |
| 3,770,301 A | 11/1973 | Adams | |
| 3,996,789 A * | 12/1976 | Wilson | 73/40.5 R |
| 4,153,747 A | 5/1979 | Young | |
| 4,155,574 A | 5/1979 | Hulsey | |
| 4,457,517 A * | 7/1984 | Dunegan | 277/608 |

(Continued)

FOREIGN PATENT DOCUMENTS

EP     874107 A1 * 10/1998

(Continued)

OTHER PUBLICATIONS

RAMCO web page printout at http://www.ramco-safetysheids.com/html/spec_2.htm dated Feb. 8, 2008.

(Continued)

*Primary Examiner*—Hezron Williams
*Assistant Examiner*—Nathaniel Kolb
(74) *Attorney, Agent, or Firm*—Martin & Associates, L.L.C.; Derek P. Martin (57) ABSTRACT

A leak detector sleeve allows performing leak detection at a flanged joint. The leak detector sleeve is made of elastomeric material that allows achieving a gas-tight seal when the leak detector sleeve encircles a flanged joint. The leak detector sleeve includes a hole that communicates with a gap in the flanged joint, thereby allowing the tip of a sniffer probe to be placed in or near the hole to detect whether the flanged joint is leaking. The leak detector sleeve is made of material that will withstand the operating temperature of the flanged joint without becoming hardened or brittle. A method for detecting a leak using the leak detector sleeve allows for efficiently and conveniently detecting leaks. In addition, the sleeve may be easily used and reused without the adverse effects or intensive manual labor required in the prior art.

6 Claims, 9 Drawing Sheets

U.S. PATENT DOCUMENTS

| | | | |
|---|---|---|---|
| 4,557,139 A * | 12/1985 | Cantwell et al. | 73/40.7 |
| 4,583,394 A | 4/1986 | Murakami et al. | |
| 4,889,167 A | 12/1989 | Morris | |
| 5,030,493 A | 7/1991 | Rich | |
| 5,117,676 A | 6/1992 | Chang | |
| 5,293,771 A | 3/1994 | Ridenour | |
| 5,330,720 A * | 7/1994 | Sorbo et al. | 422/98 |
| 5,351,037 A | 9/1994 | Martell et al. | |
| 5,386,616 A * | 2/1995 | Norvell | 24/389 |
| 5,461,904 A * | 10/1995 | Baker | 73/46 |
| 5,814,387 A * | 9/1998 | Orihara et al. | 428/63 |
| 6,149,387 A | 11/2000 | Chikami et al. | |
| 6,722,185 B2 * | 4/2004 | Lawson et al. | 73/40 |
| 6,860,141 B2 | 3/2005 | McCoy et al. | |
| 2004/0237632 A1 * | 12/2004 | Van Keeken | 73/46 |

OTHER PUBLICATIONS

Printout of web pages at www.apsonline.com/sprayshields.html Jul. 14, 2006, pp. 1-4.

Printout of web pages at www.apsonline.com/bandprotectors.html Jul. 14, 2006, pp. 1-2.

* cited by examiner

LEAK DETECTOR SLEEVE

RELATED APPLICATION

This patent application claims priority on provisional patent application 60/737,999 entitled Flange Leak Detector (FLD) filed on Nov. 18, 2005, which is incorporated herein by reference.

BACKGROUND

1. Technical Field

This disclosure pertains generally to flanged joints, and more specifically relates to leak detection at flanged joints.

2. Background Art

Figure 1:
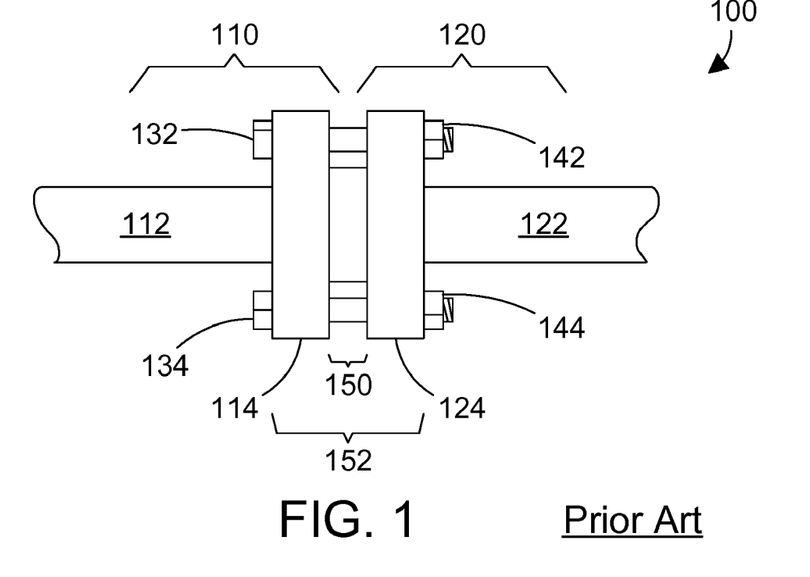
FIG. 1 is a side view of a prior art flanged joint.

Flanged connectors have been used in a variety of different applications to produce gas-tight flanged joints. One known type of flanged joint 100 is shown in FIG. 1. The flanged joint 100 has two flanged connectors 110 and 120. First connector 110 includes a pipe 112 and a flange 114. Second connector 120 includes a pipe 122 and a flange 124 that mates with flange 114. The two flanges 114 and 124 are typically joined using a plurality of bolts, two of which are shown in FIG. 1 as 132 and 134. Bolts 132 and 134 pass through aligned holes in flanges 114 and 124, and corresponding nuts 142 and 144 are used to tighten the bolts and thus mate flanges 114 and 124 in a gas-tight manner to form a flanged joint. The coupling between flanges 114 and 124 is not shown because the manner in which the flanges are coupled to form a flanged joint is well-known in the art.

Flanged connectors are often used to distribute various liquids and gasses in pipelines and equipment that use the liquids and gasses. One example of an apparatus that uses flanged connectors is gas turbines that generate electricity from natural gas. In a typical gas turbine, there are a large number of burners that must each be supplied with natural gas. As a result, a gas turbine may have a large number of flanged connectors that form flanged joints.

Figure 2:
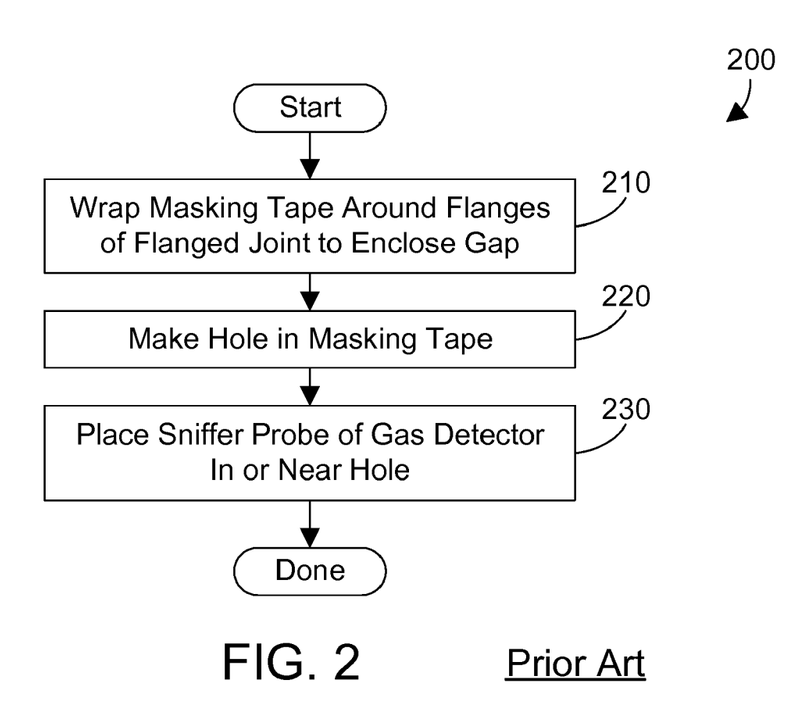
FIG. 2 is a flow diagram of a prior art method for performing leak detection of a flanged joint.

Gas turbines require periodic maintenance. Maintaining a gas turbine often requires disassembling the turbine at the flanged connectors in order to clean or replace fuel screens, repair of breakdowns, periodic scheduled inspections, periodic scheduled maintenance, etc. When the flanged connectors are reassembled into a flanged joint, a check is typically made to make sure the flanged joint does not leak gas. Referring to FIG. 2, a method 200 represents a known way to perform gas leak detection after reassembling a flanged joint. Masking tape is wrapped around the flanges of a flange joint to enclosed the gap between flanges (step 210). A hole is then made in the masking tape (step 220), typically by pressing the point of a pen or pencil through the masking tape. The tip of a sniffer probe of a gas detector is then placed in or near the hole (step 230). If the flanged joint is leaking gas, the masking tape will contain the gas in the gap between the flanges so the sniffer probe can detect the gas.

The prior art method 200 for detecting gas leaks at a flanged joint is effective, but leads to problems later on when the flanged joint needs to be disassembled again, as shown in method 300 in FIG. 3. Before the flanged joint is disassembled, the masking tape must manually be removed from the flanges (step 310). The process of removing the masking tape is very time-consuming and tedious. Because the flanges are very hot when the turbine is operating, the masking tape becomes very brittle and the adhesive on the tape becomes baked-on. As a result, a service person for the gas turbine may spend 30 minutes or more removing the masking tape on each flanged joint. While removing the masking tape, small brittle pieces of the tape may fall between the flanges. Because the gas turbine is typically exhausted through large stacks, airflow to the stacks creates a slight vacuum that sucks any pieces of masking tape into the turbine. The service person disassembles the flanged joint (step 320). In the processing of disassembling the flange joint, any small piece of masking tape between the flanges may get sucked into the gas turbine. If the service person notices a piece of masking tape getting sucked into the turbine, further disassembly typically is required to locate and retrieve the piece of masking tape. If the service person does not notice a piece of masking tape getting sucked into the turbine, the service person may completely reassemble the turbine, then test it only to find that a burner is not operating correctly due to a blockage caused by the piece of masking tape. As a result, the service person will have to disassemble the gas turbine again to locate the blockage and remove it, greatly increasing the time to service the gas turbine. Without a way to perform gas leak detection of flanged joints in a way that does not cause the problems associated with the masking tape used in the prior art, service technicians of flanged joints will continue to spend excessive time dealing with the problems that arise from using the masking tape.

BRIEF SUMMARY

A leak detector sleeve allows performing leak detection at a flanged joint. The leak detector sleeve is made of elastomeric material that allows achieving a gas-tight seal when the leak detector sleeve encircles a flanged joint. The leak detector sleeve includes a hole that communicates with a gap in the flanged joint, thereby allowing the tip of a sniffer probe to be placed in or near the hole to detect whether the flanged joint is leaking. The leak detector sleeve is made of material that will withstand the operating temperature of the flanged joint without becoming hardened or brittle. A method for detecting a leak using the leak detector sleeve allows for efficiently and conveniently detecting leaks. In addition, the sleeve may be easily used and reused without the adverse effects or intensive manual labor required in the prior art.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

Figure 3:
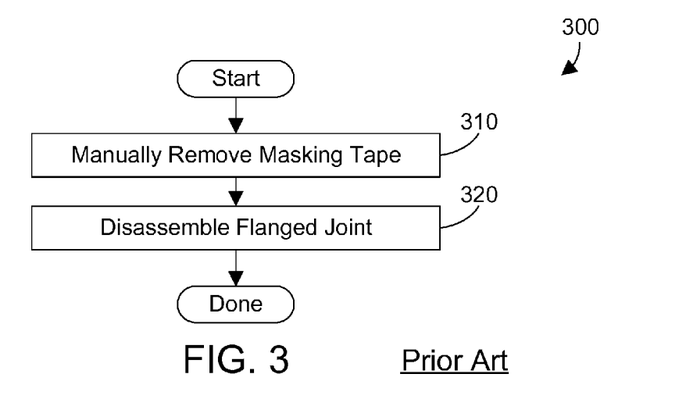
FIG. 3 is a flow diagram of a prior art method for disassembling a flanged joint.

A prior art flanged joint 100 is shown in FIG. 1, along with prior art methods 200 and 300 in FIGS. 2 and 3, respectively. The prior art is discussed in detail in the Background section above. The leak detector sleeve disclosed herein provides significant advantages when compared with the prior art by providing a sleeve that can withstand the operating temperatures of the flanged joint and that can be easily installed, removed when the flanged joint needs to be disassembled, and reinstalled after the flanged joint is reassembled.

Figure 4:
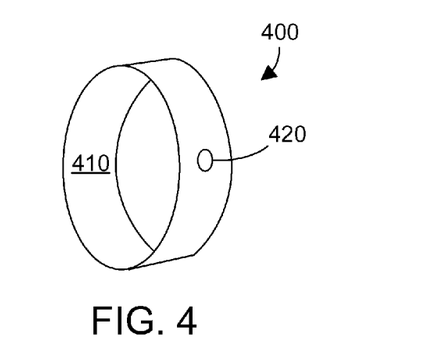
FIG. 4 is a perspective view of a circular leak detector sleeve.

Referring to FIG. 4, a first configuration for the leak detector sleeve 400 includes a circular band 410 that includes a small hole 420. Band 410 preferably has a width sufficient to span gap 150 between flanges of a flanged joint, as shown in FIG. 1, and most preferably has a width that spans to the outer edges 152 of the flanges of a flanged joint, also shown in FIG. 1. Hole 420 is located an any location on the band 410 that allows the hole 420 to communicate with the gap between flanges of a flanged joint, as shown at 150 in FIG. 1. In the most preferred configuration, the hole 420 is located at substantially the center of the width of the band 410. The width of the band 410 is preferably at least three times the width of the hole 420, as shown in FIG. 4. Leak detector sleeve 400 is preferably fabricated of an elastomeric material such as silicone rubber that provides sufficient elasticity so that the leak detector sleeve 400 may be slightly expanded and placed on a flanged joint such that the interface between the leak detector sleeve 400 and the flanges of the flanged joint achieve a gas-tight seal when the sleeve 400 contracts around the flanges. The operating temperature of a flanged joint may be as high as 200 degrees Celsius or more. Silicone rubber is especially well-suited because of its elasticity and tolerance to relatively high heat, including at temperatures in excess of 200 degrees Celsius. While silicone rubber is one suitable elastomeric material that can be used, any suitable elastomeric material may be used, including (without limitation) the following rubbers: buna-N, butyl, ethylene-propylene-diene-methylene (EPDM), epichlorohydrin (ECH), gum rubber, hypalon, latex, neoprene, polyurethane, styrene-butadiene, santoprene, sorbothane, vinyl and viton.

Figure 5:
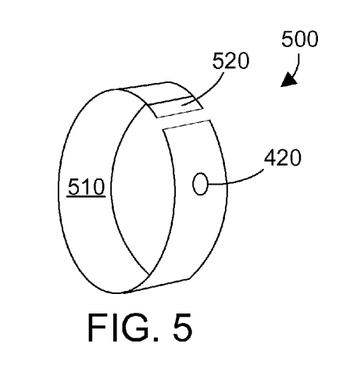
FIG. 5 is a perspective view of a linear leak detector sleeve.
Figure 6:
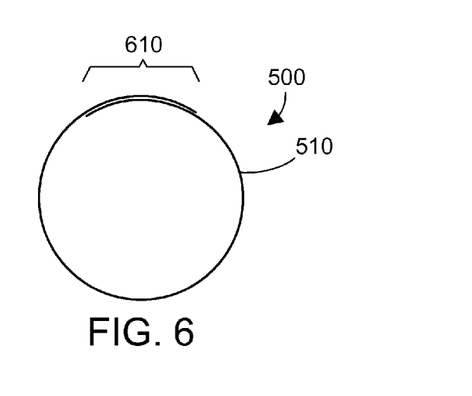
FIG. 6 is a side view of the linear leak detector sleeve in FIG. 5 when overlapped and attached to itself.

Referring to FIG. 5, a second configuration for the leak detector sleeve 500 includes a linear band 510 with a hole 420. Hole 420 is located an any location on the band 510 that allows the hole to communicate with the gap between flanges of a flanged joint, as shown at 150 in FIG. 1. In the most preferred configuration, the hole 420 is located at substantially the center of the width of the band 510. Linear band 510 is preferably wrapped around the flanges of a flanged joint and attached to itself using a fastener 520 in an overlap region 610 shown in FIG. 6. The overlap region 610 shown in FIG. 6 is a relatively small portion of the length of the band 510. Note, however, that the band 510 may have sufficient length to allow wrapping the band 510 around the flanges to achieve any suitable length of overlap region, including multiple wraps of band 510.

Figure 7:
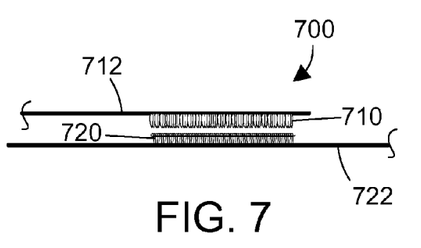
FIG. 7 is an enlarged view of the overlap region 610 of the linear leak detector sleeve in FIG. 6 showing a hook-and-loop fastener.
Figure 8:
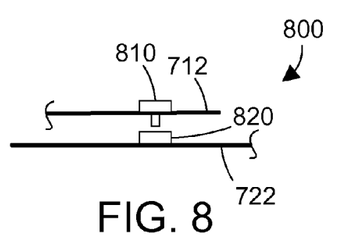
FIG. 8 is an enlarged view of the overlap region 610 of the linear leak detector sleeve in FIG. 6 showing a snap fastener.
Figure 9:
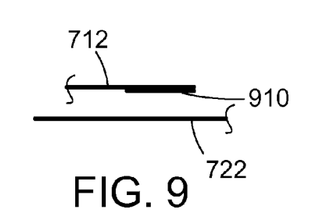
FIG. 9 is an enlarged view of the overlap region 610 of the linear leak detector sleeve in FIG. 6 showing an adhesive fastener.
Figure 10:
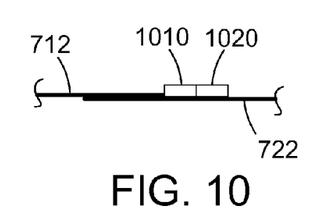
FIG. 10 is an enlarged view of the overlap region 610 of the linear leak detector sleeve in FIG. 6 showing a zipper-type fastener.
Figure 11:
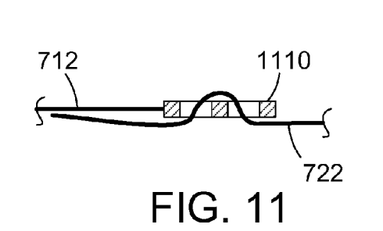
FIG. 11 is an enlarged view of the overlap region 610 of the linear leak detector sleeve in FIG. 6 showing a first buckle fastener.
Figure 12:
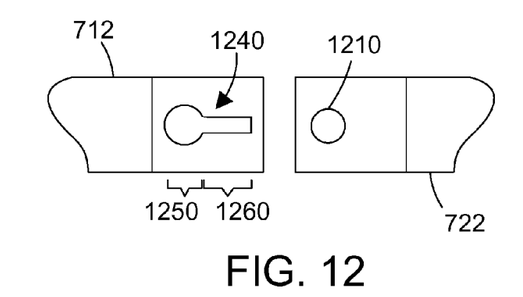
FIG. 12 is an enlarged top view of the overlap region 610 of the linear leak detector sleeve in FIG. 6 showing a second buckle fastener.
Figure 13:
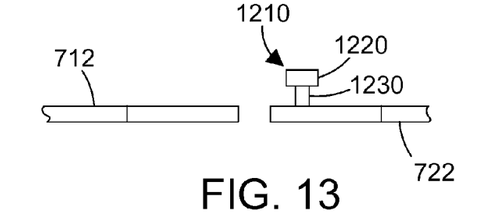
FIG. 13 is an enlarged side view of the second buckle fastener shown in FIG. 12.

Any suitable fastener 520 may be used to attach the band 510 to itself in the overlap region 610. Suitable fasteners include one or more hook-and-loop fasteners, one or more snaps, one or more adhesive regions on band 510 that allows band 510 to be attached to itself, one or more zippers, one or more buckles, or any other type of fastener, whether currently known or developed in the future, that is capable of attaching one portion of band 510 to another portion of band 510 when band 510 is wrapped around flanges of a flanged joint. Some examples of suitable fasteners are shown in FIGS. 7-13. FIG. 7 shows a hook-and-loop type fastener 700 that includes a hook portion 720 on a first portion 722 that attaches to a loop portion 710 on a second portion 712. FIG. 8 shows a snap fastener 800 with a male portion 810 and a female portion 820 that allows the male portion 810 to be snapped into the female portion 820. FIG. 9 shows an adhesive region 910 on the band that allows the band 510 to stick to itself. Adhesive region 910 most preferably includes a low-strength adhesive that allows the band 510 to be reused a number of time, but may optionally include high-strength adhesive that creates a permanent bond. FIG. 10 shows a zipper-type fastener with a first portion 1010 that may be zipped to second portion 1020. The fastener shown in FIG. 10 is also representative of an alligator transmission belt lacing that is commonly used to join two sections of a conveyer belt together. FIG. 11 shows a first buckle-type fastener. FIGS. 12 and 13 show a second buckle-type fastener that includes a stud 1210 that includes a head portion 1220 and a reduced-diameter post 1230, with a keyhole-shaped opening 1240 that includes a circular portion 1250 that is larger than the head portion 1220 of the stud, and a slot portion 1260 that is larger than the reduced-diameter post 1230 but smaller than the head portion 1220 of the stud. This configuration allows the head portion 1220 to be placed within the circular portion 1250, and the elastomeric nature of the band 510 will then cause the reduced diameter portion 1230 to slide along the slot 1260, thereby fastening the band to itself.

Figure 14:
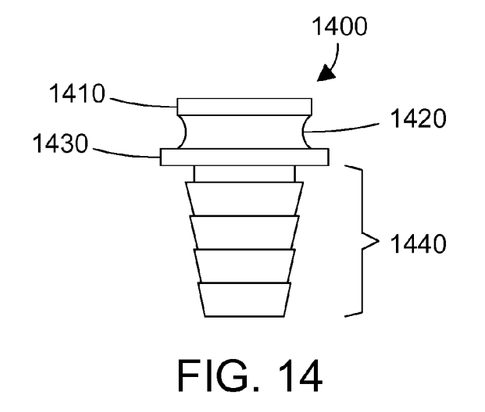
FIG. 14 is an enlarged side view of a connector that may be placed in the hole 420 of the sleeve 400 in FIG. 4 or the sleeve 500 in FIG. 5.
Figure 15:
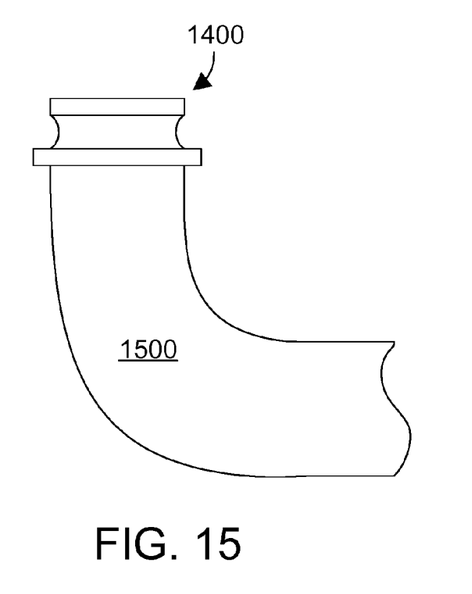
FIG. 15 is an enlarged side view of the connector in FIG. 14 coupled to a tube.

Referring to FIG. 14, a connector 1400 may be used to attach a tube to the hole 420 in the leak detector sleeve. The connector 1400 preferably has a circular cross-section, and includes first and second members 1410 and 1430 that have a diameter larger than the hole, and a reduced diameter portion 1420 between first and second members 1410 and 1430 that has a diameter larger than the hole 420. This configuration provides a gas-tight connection between the connector and the hole 420 when the hole 420 is placed over the first member 1410 such that the hole contracts against the reduced diameter portion 1420. Connector 1400 also includes a body portion 1440 for attaching to an optional tube. FIG. 15 shows connector 1400 attached to the first end of a tube 1500. The second end of the tube 1500 may be connected to any suitable gas detector or liquid detector. When the leak detector sleeve 400 or 500 is used with the connector 1400 and tube 1500 shown in FIG. 15, the sleeve may be used to detect leaks of any gas or liquid at the flanged joint. For example, the second end of tube 1500 may be connected to a detector that provides an audible alarm, or that provides electronic detection of the leak draft2 and notification to shut down a process that is causing gas or liquid to flow through the flanged joint.

Figure 16:
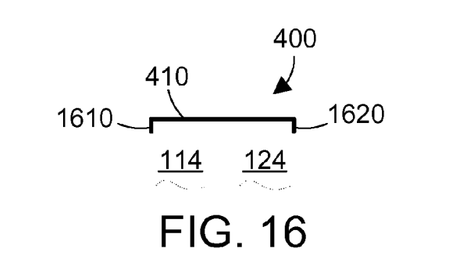
FIG. 16 is a cross-sectional view of an alternative configuration for the leak detector sleeve that includes outer lips that help to locate the flanged sleeve in the correct position.
Figures 17, 18:
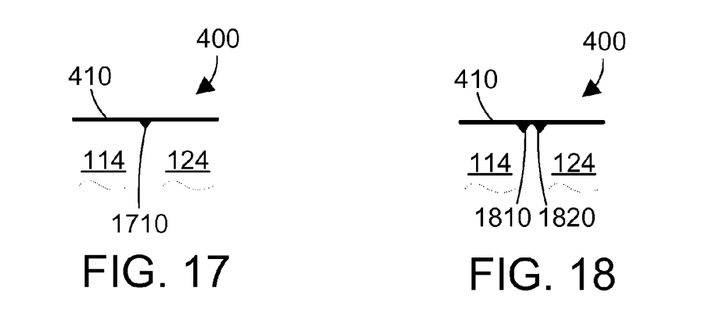
FIG. 17 is a cross-sectional view of an alternative configuration for the leak detector sleeve that includes an inner rib that helps to locate the flanged sleeve in the correct position.
FIG. 18 is a cross-sectional view of an alternative configuration for the leak detector sleeve that includes multiple inner ribs that helps to locate the flanged sleeve in the correct position.

The leak detector sleeve may include optional features that aid in its installation and use, as shown in FIGS. 16-18. FIG. 16 shows band 410 that includes a first lip 1610 on a first outer edge and a second lip 1620 on a second outer edge of the leak detector sleeve. These lips 1610 and 1620 allow the sleeve to be properly installed on a flanged joint, the upper part of which is shown in phantom in FIGS. 16-18. Note that the leak detector sleeve may include a lip on one or both outer edges. Referring to FIG. 17, the leak detector sleeve 400 may also optionally include a rib 1710 parallel to the outer edges of band 410 that simplifies the aligning of band 410 on the flanges of a flanged joint. Referring to FIG. 18, the leak detector sleeve 400 may optionally include a plurality of ribs 1810 and 1820 that align with edges of the flanges of a flanged joint that simplify the aligning of band 410 on the flanges of a flanged joint. While the circular leak detector sleeve 400 is referenced in FIGS. 16-18, this is shown by way of example, and the optional features in FIGS. 16-18 could also be incorporated into linear leak detector sleeve 500 as well.

Figure 19:
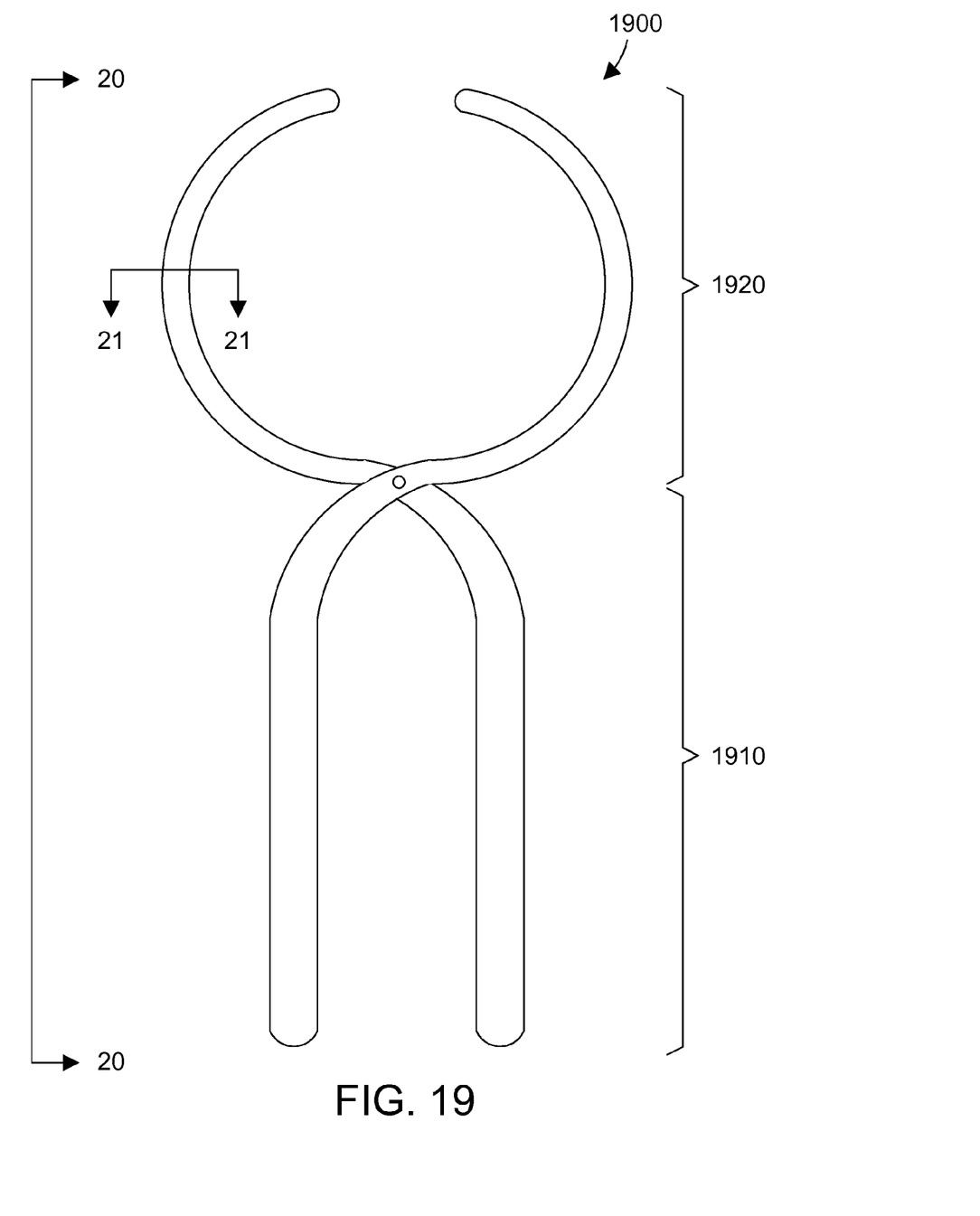
FIG. 19 is a front view showing an expander tool for expanding the leak detector sleeve.

A tool may be used to install the circular leak detector sleeve 400 shown in FIG. 4. Referring to FIG. 19, a tool 1900 includes handles 1910 and jaws 1920 that operate similar to conventional pliers. The jaws 1920 are preferably semi-circular in shape so they form a circle having an inner diameter that is approximately the same as the outer diameter of flanges on a flanged joint when the handles are squeezed together such that the jaws 1920 contact each other. By spreading the handles apart, the circular leak detector sleeve 400 may be expanded so it may be easily placed on the flanges of a flanged joint. Note that the jaws 1920 of the tool 1900 spread apart a sufficient distance to allow a pipe to pass through the gap between the jaws, thereby allowing the jaws 1920 to encircle a flanged joint when it is coupled to a pipe.

Figures 20, 21:
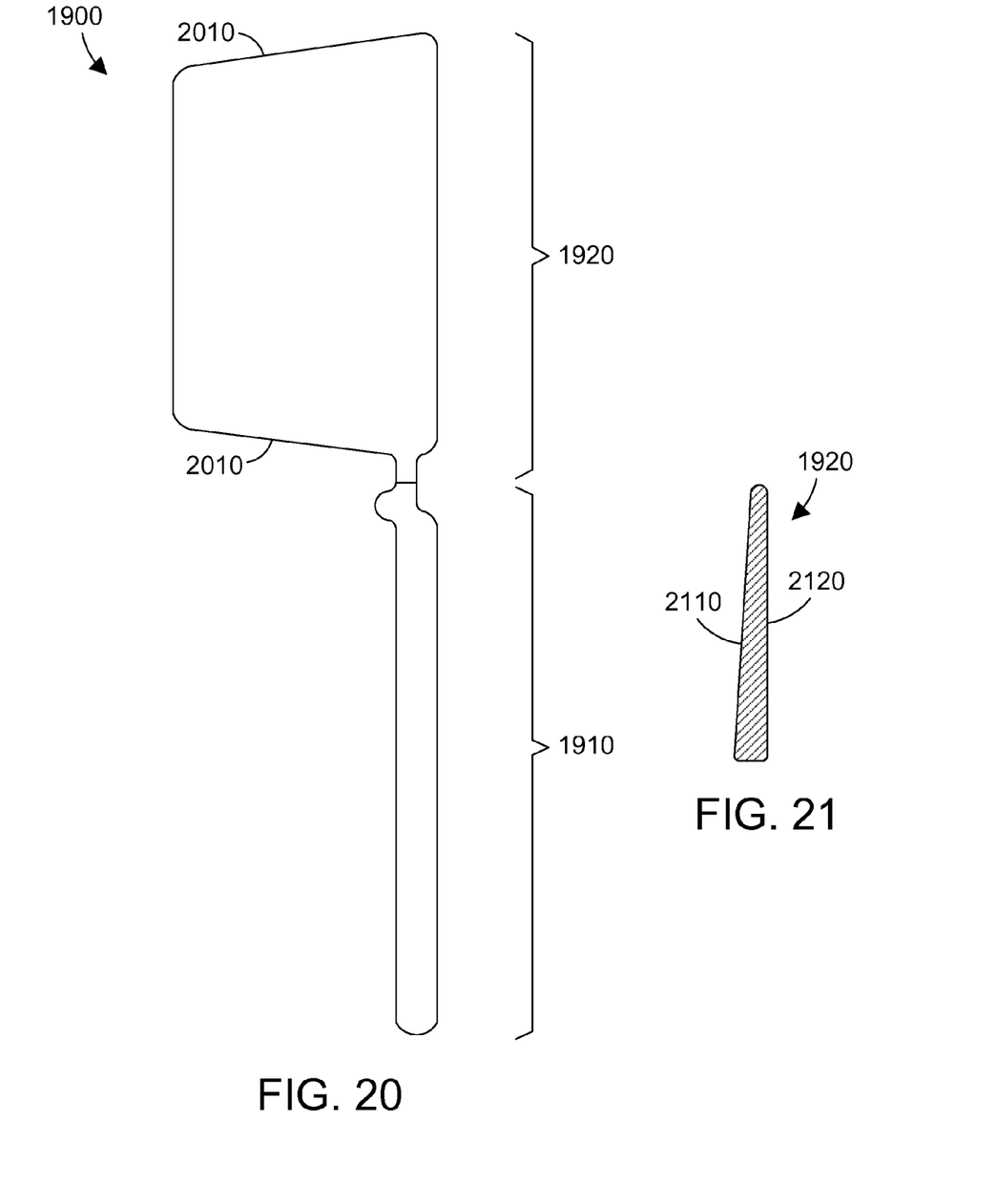
FIG. 20 is a side view of the expander tool in FIG. 19 taken along the line 20-20.
FIG. 21 is a cross-sectional view of a portion of the expander tool in FIG. 19 taken along the line 21-21.

A side view of tool 1900 is shown in FIG. 20, and represents the view of the tool in FIG. 19 taken along the line 20-20. Note that jaws 1920 have a relatively wide, tapered shape that allows a circular leak detector sleeve 400 to be expanded in a non-uniform manner. The jaws 1920 of the tool preferably have a tapered cross-section as shown in FIG. 21, with a flat portion 2120 being against the flanges and the tapered portion 2110 being against the leak detector sleeve as the leak detector sleeve is being installed. The tapered edges allow the circular leak detector sleeve to more easily slide off the tool onto the flanged joint.

Figure 22:
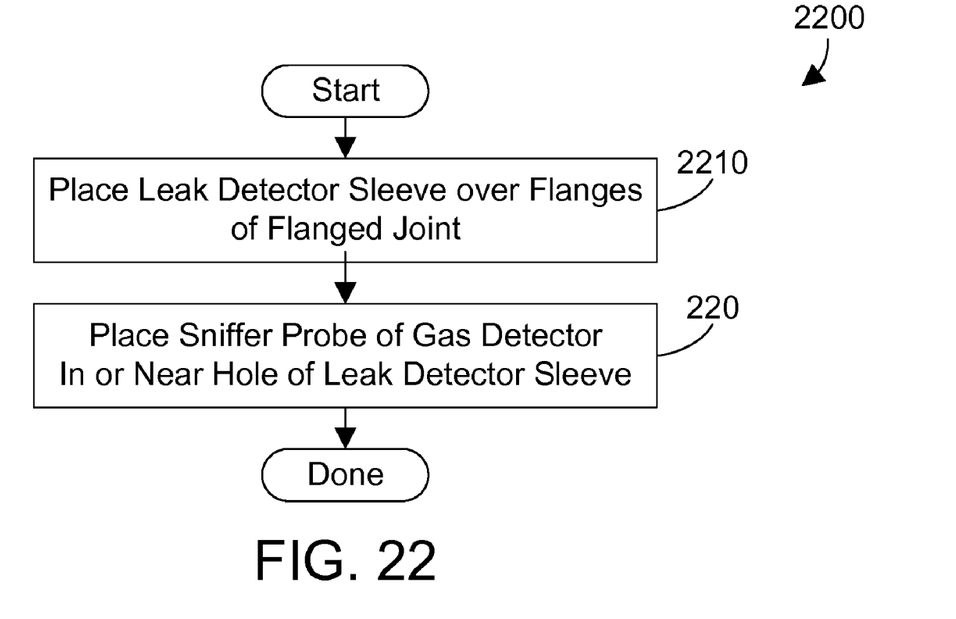
FIG. 22 is a flow diagram of a method for performing leak detection of a flanged joint.

With the leak detector sleeves shown in FIGS. 4 and 5, the method for detecting leaks at a flanged joint becomes much easier compared to the prior art method that uses masking tape discussed in the Background section above. Referring to FIG. 22, a method 2200 for detecting a leak at a flanged joint begins by placing a leak detector sleeve over the flanges of a flanged joint (step 2210). A sniffer probe is then placed in or near the hole in the leak detector sleeve (step 220). Any gas that leaks at the flanged joint is trapped by the leak detector sleeve, thereby allowing the sniffer probe to detect a gas leak at the flanged joint.

Figure 23:
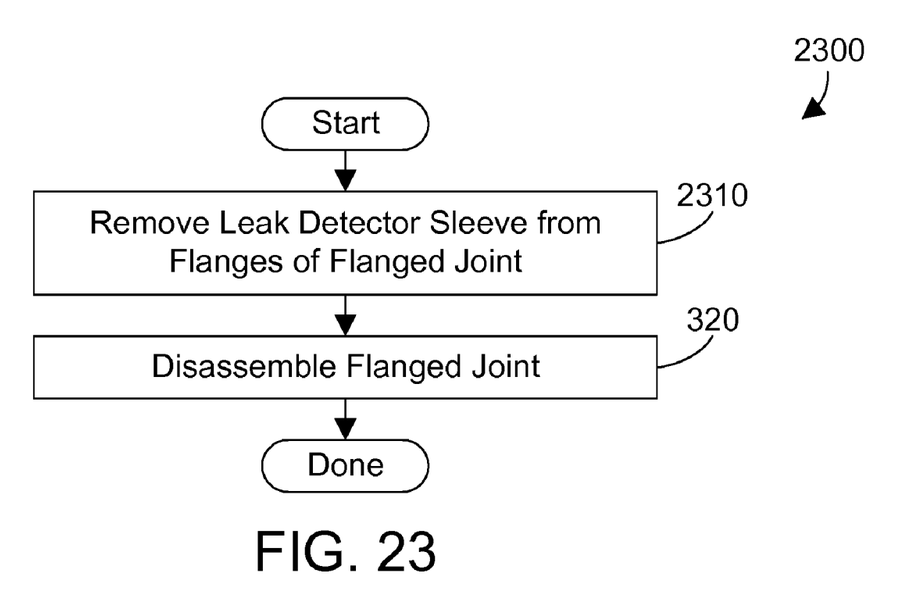
FIG. 23 is a flow diagram of a method for disassembling a flanged joint.

Referring to FIG. 23, a method 2300 for disassembling a flanged joint begins by removing a leak detector sleeve from the flanges of the flanged joint (step 2310). The flanged joint is then disassembled (step 320). Note that removing the elastomeric sleeve in step 2310 takes only a few seconds, instead of requiring several minutes to scrape the old masking tape off the flanges. The sleeve is thus reusable and provides significant labor savings compared to known methods of leak detection at flanged joints.

Figure 24:
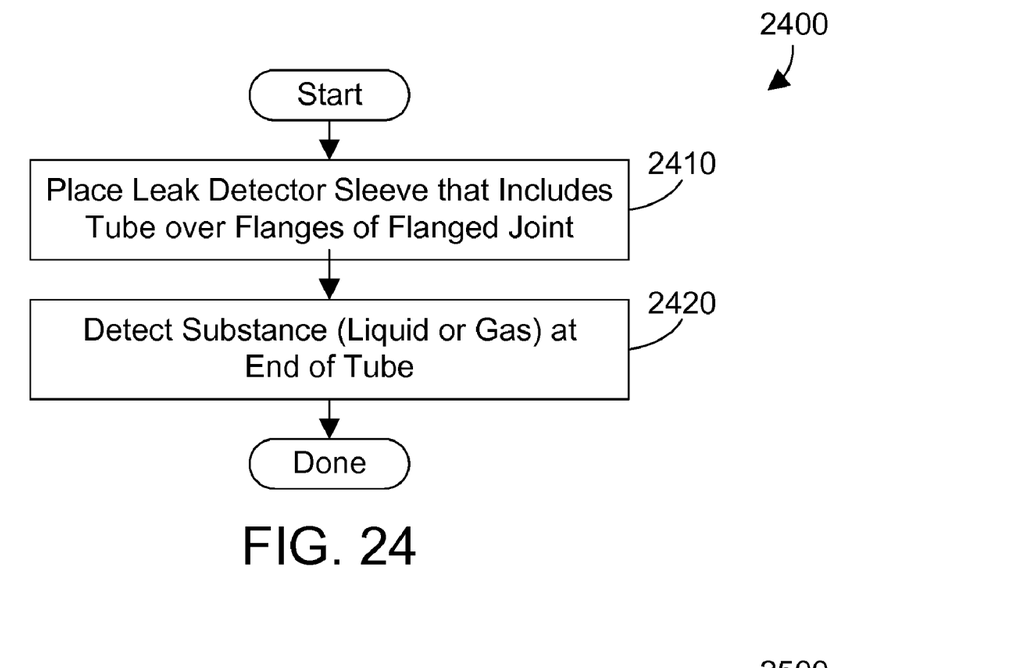
FIG. 24 is a flow diagram of a method for performing leak detection of a flanged joint using a leak detector sleeve that includes a tube coupled to the hole of the leak detector sleeve.

A leak detector sleeve may include a connector with a tube as shown in FIG. 15 installed in hole 420. With this configuration, it is possible to detect and report leaks remotely. Referring to FIG. 24, a method 2400 begins by placing a leak detector sleeve that includes a tube at its hole over the flanges of a flanged joint (step 2410). If a substance leaks at the flanged joint, the substance may be detected at the end of the tube (step 2420). Note that the location of the tube on the flanged joint may depend on the gas or liquid being detected. If a gas that is lighter than air is being detected, the tube could be placed on the top of the flanged joint. If a gas that is heavier than air or a liquid is being detected, the tube could be placed at the bottom of the flanged joint. The tube allows the leak to be detected and reported via an alarm or via electronic notification that can be used to shut down a process that causes the gas or liquid to flow through the flanged joint.

In the most preferred use of the circular leak detector sleeve 400, the sleeve 400 may be installed on a flanged joint during the initial installation of the flanged joint. Whenever disassembly of the flanged joint is required, the sleeve 400 may be easily slid off the flanges, and the flanged joint may be disassembled. Once the flanged joint is reassembled, the sleeve may be easily reinstalled on the flanged joint to detect whether a leak exists at the flanged joint. In this manner, it may be possible to use a single sleeve for the entire useful life of the flanged joint. The result is significant labor savings when servicing flanged joints. Note that leak detector sleeve 400 may be any suitable size to accommodate any size of flanged joints.

The linear leak detector sleeve 500 may include a single fastener that makes leak detector sleeve 500 suitable for a particular size of flanged connection, or may include multiple fasteners that makes leak detector sleeve 500 suitable for use with flanged connections of various sizes. For example, the leak detector sleeve 500 could include a single hook portion of a hook-and-loop fastener, and several spaced-apart loop portions that allow the leak detector sleeve 500 to be adjusted to a wide range of flange sizes. The linear leak detector sleeve 500 is well-suited to performing leak detection on pipelines and other flanged connections where disassembly of the connection is not normally performed. In both the circular leak detector sleeve 400 and the linear leak detector sleeve 500, there is no adhesive on the interior portion that contacts the flanges of a flanged joint, thereby preventing the problems associated with cleaning adhesive off of the flanges when the leak detector sleeve is removed.

Figure 25:
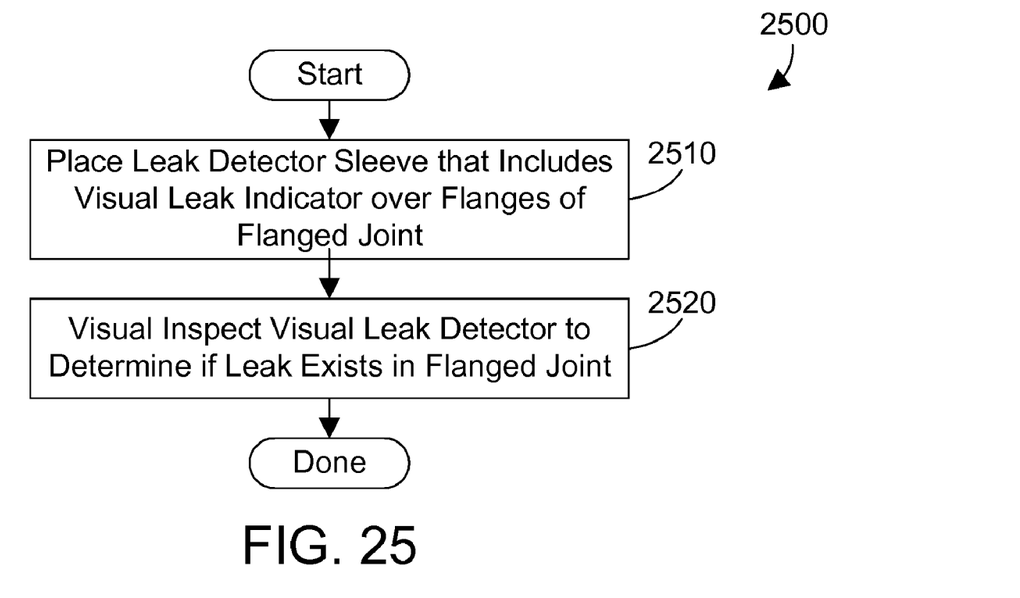
FIG. 25 is a flow diagram of a method for visually inspecting flanged joints for leaks using the leak detector sleeve.
Figure 26:
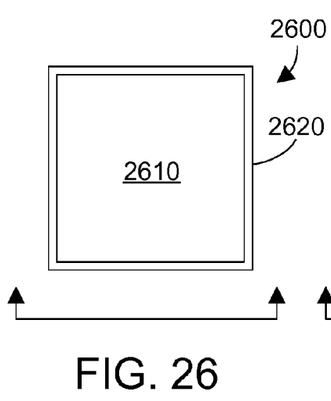
FIG. 26 is a top view of a visual leak indicator that shows color when a leak in the flanged joint is present.
Figure 27:
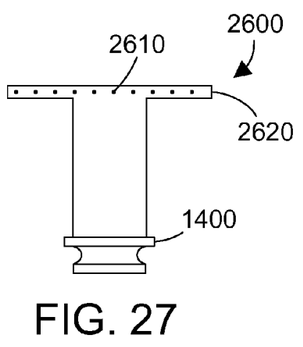
FIG. 27 is a side view of the visual leak indicator of FIG. 26.

Visual leak indicators may also be used in connection with the leak detector sleeves 400 and 500 described above. Referring to FIG. 25, a method 2500 uses a visual leak indicator with a leak detector sleeve to provide a visual indication of a leak at a flanged joint. First, a leak detector sleeve that includes a visual leak indicator is placed over the flanges of a flanged joint (step 2510). The visual leak indicator is placed in the hole 420 in the leak detector sleeve, and is preferably positioned so it may be visually observed by an inspector. The inspector then visually inspects the visual leak indicator to determine if a leak exists in the flanged joint (step 2520). The visual leak indicator in combination with a leak detector sleeve provides a simple and effective way to visually determine whether a leak exists at a flanged joint.

There are many possible variations for a visual leak indicator, and the claims herein expressly extend to any suitable visual leak indicator, whether currently known or developed in the future. Possible configurations for visual leak indicator are shown in FIGS. 26-33. The visual leak indicators shown in FIGS. 26-33 all include a connector 1400 similar to that shown in FIGS. 14 and 15 that allows simply coupling the visual leak indicators to the hole 420 in the leak detector sleeves 400 and 500. Visual leak indicator 2600 in FIGS. 26 and 27 includes an enclosure 2620 that encloses an indicator sheet 2610 that changes color when it comes in contact with the gas or liquid that passes through the flanged joint. A transparent window above the indicator sheet allows an inspector to visually determine whether a leak at the flanged joint exists by checking the color of the indicator sheet 2610.

Figures 28, 30:
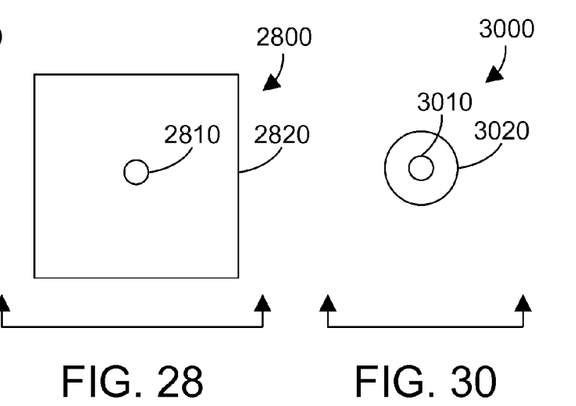
FIG. 28 is a top view of a visual leak indicator that lights up when a leak in the flanged joint is detected.
FIG. 30 is a top view of a visual leak indicator that pops up when a leak in the flanged joint is detected.
Figure 29:
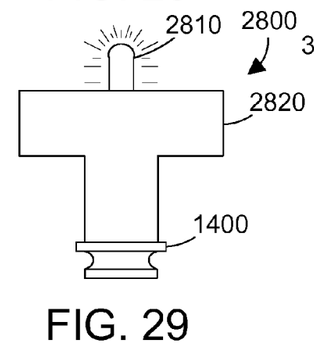
FIG. 29 is a side view of the visual leak indicator of FIG. 28.
Figure 31:
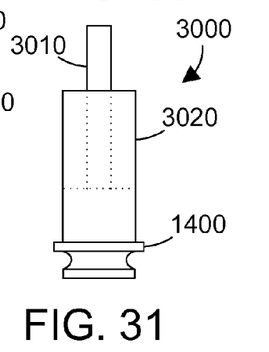
FIG. 31 is a side view of the visual leak indicator of FIG. 30.
Figure 32:
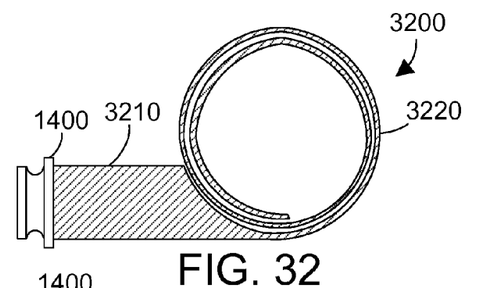
FIG. 32 is a side view of a visual leak indicator that rolls out like a party favor when a leak in the flanged joint is detected.
Figure 33:
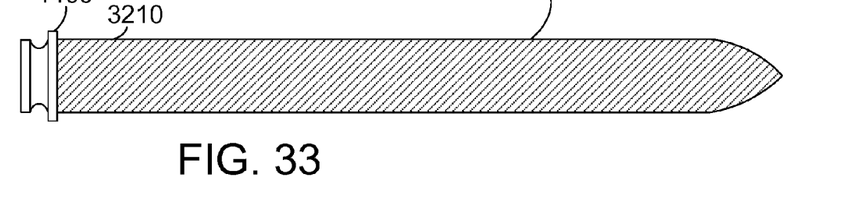
FIG. 33 is the side view of the visual leak indicator in FIG. 32 that is rolled out to indicate a leak in the flanged joint.

Referring to FIGS. 28 and 29, a visual leak indicator 2800 includes an enclosure 2820 with a light 2810 that is turned on to indicate a leak. Enclosure 2820 preferably houses a small battery and electronics powered by the battery that detect a leak and illuminate the light 2810 when a leak is detected. Light 2810 can be any suitable color. Referring to FIGS. 30 and 31, a visual leak indicator 3000 includes a cylindrical enclosure 3020 with a cylindrical indicator 3010 that pops up to indicate a leak. This can be thought of as being similar to a pop-up timer on a turkey that indicates a turkey is done. When a leak is detected, the indicator 3010 pops out of the housing 3020. Referring to FIGS. 32 and 33, visual leak indicator 3200 includes a rigid portion 3210 and a flexible portion 3220 that is rolled up when there is no leak, and that rolls out as shown in FIG. 33 when the pressure of a leak in the flanged joint causes the flexible portion 3220 to unroll. Visual leak indicator 3200 can be thought of as being similar to a child's party favor that unrolls when the child blows in it.

Note that the various visual leak indicators shown in FIGS. 26-33 can not only indicate the presence of a leak, but can also provide an indication of the severity of the leak. For example, the indicator sheet 2610 in FIGS. 26 and 27 could turn a light color for a slight leak, and a much darker hue of the same color or even a different color for a more significant leak. The light 2810 in FIGS. 28 and 29 could be dim for a slight leak, and bright for a more significant leak. In the alternative, the light 2810 in FIGS. 28 and 29 could flash slowly for a slight leak, and flash quickly for a more significant leak. The cylindrical indicator 3010 in FIGS. 30 and 31 could function similar to a tire gauge, popping up slightly to indicate a slight leak, and popping up higher to indicate a more significant leak, with the height being proportional to the pressure between the flanges of the flanged joint. The visual leak indicator 3200 in FIGS. 32 and 33 would unroll slightly for a slight leak, and unroll most or all of the way for a more significant leak. Note that holes could be placed at the far tip of the flexible portion 3220 so that the flexible portion 3220 does not rupture when a significant leak occurs.

Note that the visual leak indicator may be used in conjunction with a tube as shown in FIG. 15 so the visual leak indicator may be placed at a remote location with respect to the flanged joint. This flexibility allows placing visual leak indicators at a location that is more convenient for visual inspection. For example, in a large gas turbine that generates electricity, the flanged joints on the gas supply lines could include tubes that all run to a common panel with visual leak indicators. This configuration allows an inspector to visually inspect the visual leak indicators for all the flanged joints at a single location, thereby simplifying the inspector's job.

The ability to easily provide visual leak indicators in combination with the leak detector sleeve provides a simple and cost-effective way to detect leaks in a variety of different environments. For example, leak detector sleeves with visual leak indicators could be placed at each flanged joint along the length of a long pipeline. An inspector can easily determine whether any of the flanged joints are leaking by visually inspecting the visual leak indicators at each joint. A complex installation, such as a power plant, could use leak detectors sleeves with visual leak indicators on each flanged joint, allowing an inspector to easily determine from a visual inspection whether any flanged joints are leaking.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A method for detecting a leak at a flanged joint comprising first and second flanges coupled to respective first and second pipes, the method comprising the steps of:

(A) stretching and moving an elastomeric leak detector sleeve over the first flange of the flanged joint so the elastomeric leak detector sleeve is around the first pipe, the elastomeric leak detector sleeve comprising a circular band of elastomeric material having a width and forming a complete circle with no joints;

(B) mechanically coupling the first flange to the second flange;

(C) stretching and moving the elastomeric leak detector sleeve from the first pipe over a gap between the first and second flanges of the flanged joint, the leak detector sleeve including a hole that communicates with the gap when the leak detector sleeve is placed over the first and second flanges of the flanged joint; and (D) placing a tip of a sniffer probe into or near the hole to detect whether a gas exists in the gap between the two flanges of the flanged joint.

2. The method of claim 1 further comprising the steps of:
(E) removing the elastomeric leak detector sleeve from the flanged joint by stretching and moving the elastomeric leak detector sleeve past one of the first and second flanges to one of the first and second pipes;
(F) disassembling the flanged joint;
(G) reassembling the flanged joint;
(H) replacing the elastomeric leak detector sleeve over the gap of the flanged joint, and
(I) performing step (D) to determine whether a leak exists at the flanged joint.

3. A method for detecting a leak at a flanged joint comprising first and second flanges coupled to respective first and second pipes, the method comprising the steps of:
(A) stretching and moving an elastomeric leak detector sleeve over the first flange of the flanged joint so the elastomeric leak detector sleeve is around the first pipe, the elastomeric leak detector sleeve comprising a circular band of elastomeric material having a width and forming a complete circle with no joints;
(B) mechanically coupling the first flange to the second flange;
(C) stretching and moving the elastomeric leak detector sleeve from the first pipe over a gap between the first and second flanges of the flanged joint, the leak detector sleeve including a hole that communicates with the gap when the leak detector sleeve is placed over the first and second flanges of the flanged joint, the elastomeric leak detector sleeve comprising a tube having a first end coupled to the hole and extending from an outer surface of the elastomeric leak detector sleeve; and
(D) detecting the presence of a substance at a second end of the tube.

4. A method for detecting a leak at a flanged joint comprising first and second flanges coupled to respective first and second pipes, the method comprising the steps of:
(A) stretching and moving an elastomeric leak detector sleeve over the first flange of the flanged joint so the elastomeric leak detector sleeve is around the first pipe, the elastomeric leak detector sleeve comprising a circular band of elastomeric material having a width and forming a complete circle with no joints;
(B) mechanically coupling the first flange to the second flange;
(C) stretching and moving the elastomeric leak detector sleeve from the first pipe over a gap between the first and second flanges of the flanged joint, the leak detector sleeve including a hole that communicates with the gap when the leak detector sleeve is placed over the first and second flanges of the flanged joint, the leak detector sleeve further comprising a visual leak indicator coupled to the hole; and
(D) visually inspecting the visual leak indicator to determine whether a leak exists between the two flanges of the flanged joint.

5. The method of claim 3 further comprising the steps of:
(E) removing the elastomeric leak detector sleeve from the flanged joint by stretching and moving the elastomeric leak detector sleeve past one of the first and second flanges to one of the first and second pipes;
(F) disassembling the flanged joint;
(G) reassembling the flanged joint;
(H) replacing the elastomeric leak detector sleeve over the gap of the flanged joint, and
(I) performing step (D) to determine whether a leak exists at the flanged joint.

6. The method of claim 4 further comprising the steps of:
(E) removing the elastomeric leak detector sleeve from the flanged joint by stretching and moving the elastomeric leak detector sleeve past one of the first and second flanges to one of the first and second pipes;
(F) disassembling the flanged joint;
(G) reassembling the flanged joint;
(H) replacing the elastomeric leak detector sleeve over the gap of the flanged joint, and
(I) performing step (D) to determine whether a leak exists at the flanged joint.

* * * * *